United States Patent
Wright et al.

[15] 3,673,705
[45] July 4, 1972

[54] EDUCATIONAL FLUID FLOW SYSTEM

[72] Inventors: David Ellis Wright, 13 Hornefield Road, Radlett; John David Hardwick, 13 Princes Gardens, London, both of England

[22] Filed: March 9, 1970

[21] Appl. No.: 17,618

[52] U.S. Cl. ...................................................35/19 R
[51] Int. Cl. ..............................................G09b 23/12
[58] Field of Search ...........................35/10, 13, 17, 19

[56] References Cited

UNITED STATES PATENTS 3,541,705  11/1970  Nelson ................................35/19 R
2,556,043  6/1951  Rouck ...................................35/17

Primary Examiner—Robert W. Michell
Attorney—Petherbridge, O'Neill & Lindgren

[57] ABSTRACT

An educational fluid flow observation and measuring system, primarily a functional apparatus, which is designed to serve as an educational aid. The apparatus can be considered to consist of two major components: fluid circulation system and a fluid observation and measuring apparatus. The fluid circulation system is self-contained and is designed to pump a fluid, such as water, at a controllable flow rate from a sump to and through the observation and measuring apparatus and to return the fluid to the sump for recirculation. The observation and measuring apparatus contains various means for measuring and studying hydraulic and fluid flow principles and includes control devices for varying fluid inlet and outlet openings and a manually adjustable mechanism to permit the vertical variation of the fluid flow channel.

15 Claims, 3 Drawing Figures

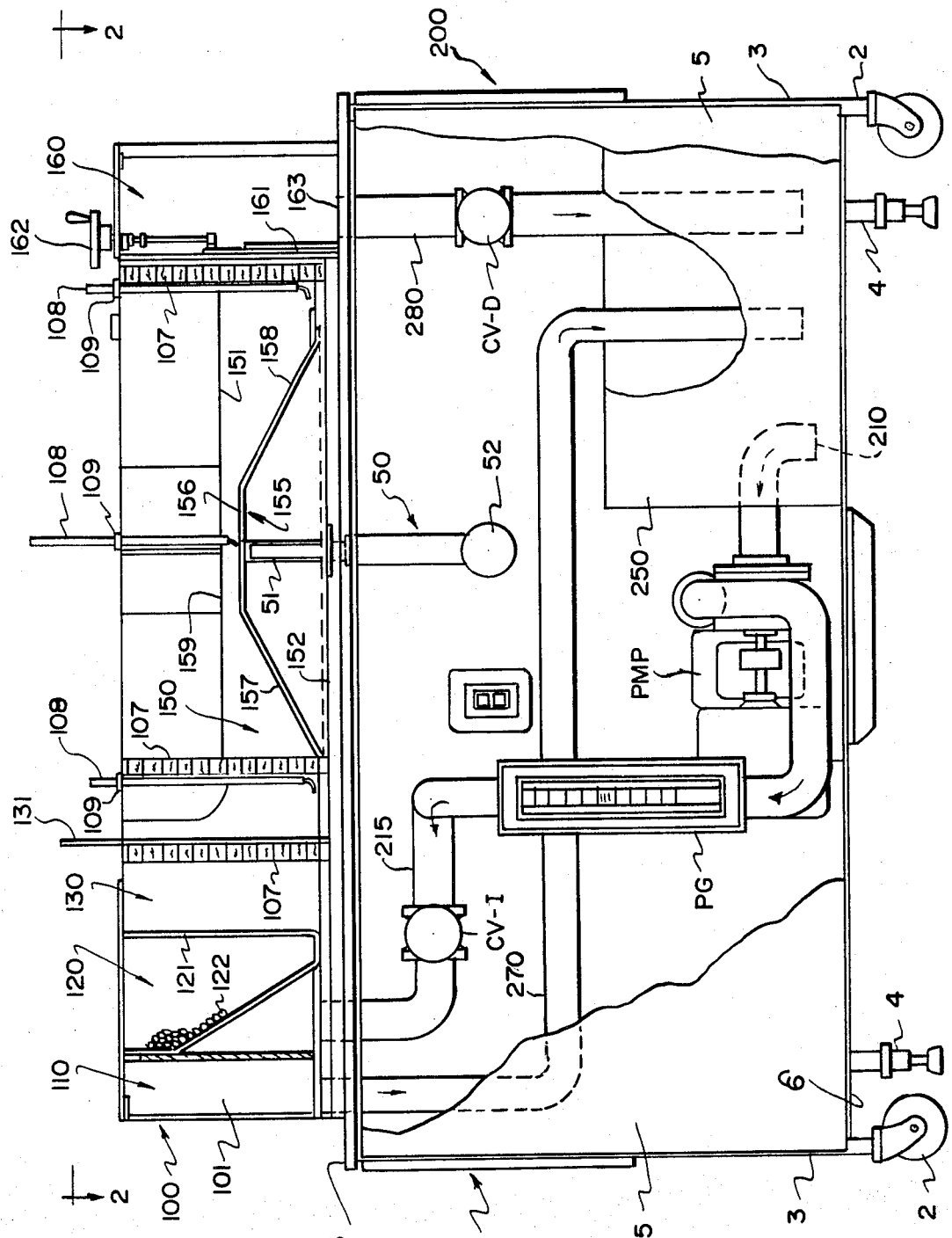

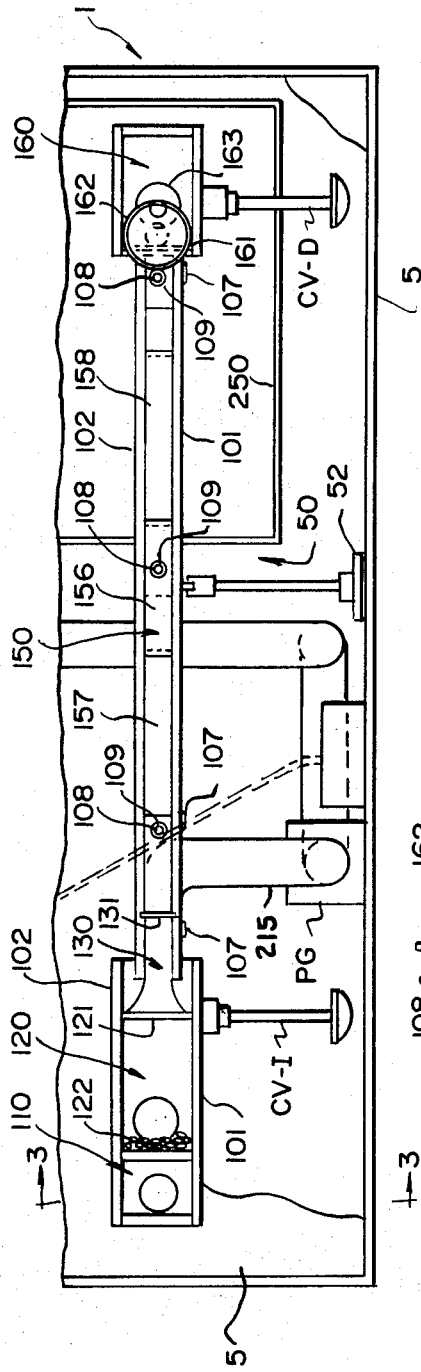
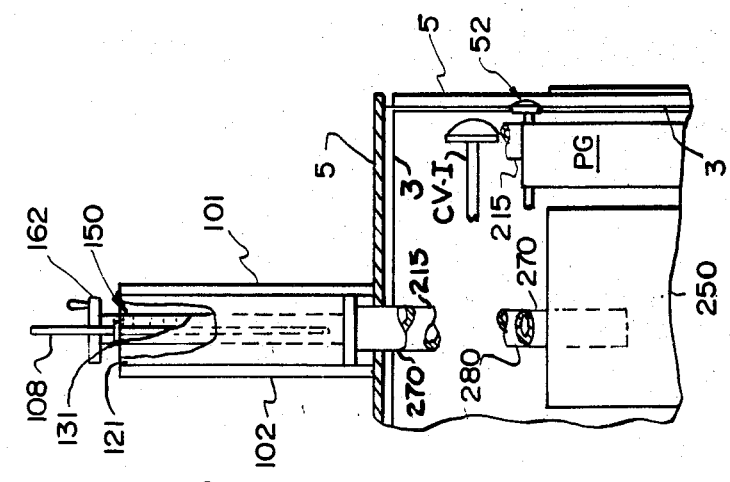

EDUCATIONAL FLUID FLOW SYSTEM

The teaching profession at all levels of instructions has long been confronted with the problem of the effective development of learning and creative thought processes of students. The lecture system of education, primarily involving the imposition of knowledge of the instructor on the mind of the student, has been in favor in the teaching profession for many years. This conventional lecture approach involves several acknowledged short-comings. First, each of the students in a lecture group is ordinarily carried at the instructional pace of the teacher with virtually no concessions being made for individual students who are unable to grasp the subject matter at the teacher's pace and with no inducements made for the more rapid advancement of individuals capable of digesting material at a more rapid rate.

Second, the lecture system does little to encourage learning or learning how to learn by individuals in the group. The knowledge of the instructor is directed to the students as a group. This knowledge is imposed upon each student, absorbed or digested in part or fully by some and lost in full or in part by others. The long range result of the system is to essentially foster the mediocrity of an entire student group.

In the lecture or imposed knowledge approach to education, visual aids are frequently employed to demonstrate various phenomena. Visual aids may take the form of rudimentary devices or of highly sophisticated precision laboratory equipment. Presently, some schools have permanent instructional installations for use in the presentation of educational demonstrations of the flow characteristics of fluids. These installations ordinarily are expensive and, being permanent in nature, prevent the flexible use of valuable laboratory and classroom space. However, regardless of the type or form of the visual aid used in connection with lecture demonstrations, the individual student is only permitted to observe that which is demonstrated by the instructor. The student is effectively isolated from the visual aid and has virtually no opportunity to pursue personal inquiries relating to an understanding of that which is being demonstrated. The student is thereby isolated from the full development of his mental processes in relation to the visual aid before him.

The shortcomings of the conventional lecture system of education and the equipment used for demonstrative purposes under this educational approach have led applicant to the development of educational equipment which is designed not to serve primarily as a visual or teaching aid, but is designed to serve as a direct aid to learning.

The fluid flow observation and measuring apparatus or system of the invention is designed to assist students, individually, in the realization of the full potential of their learning capacities. The system of the invention will serve to improve, simplify and accelerate the learning process of individual students in accordance with the ability of each such student to absorb the technology involved in hydraulics and fluid flow. The apparatus of the invention will also enable a student to utilize to the fullest, his undirected creative talents and ingenuity in dealing with hydraulic and fluid flow phenomena and to apply the developed learning techniques in other fields of technology.

SUMMARY OF THE INVENTION

It is, therefore, an object of this invention to improve educational or testing apparatus.

Another object of this invention is to facilitate the measuring and studying of hydraulic and fluid flow principles throughout variable predetermined and transitory states.

A further object of the invention is to improve hydraulic and fluid flow teaching and experimentation apparatus by providing a modular self-contained adjustable bed flow channel system adapted to function as a water tunnel or as an open channel fluid flow system.

Still another object of this invention is to improve fluid flow teaching and experimentation apparatus by adjustably controlling all flow parameters to enable complete variation of fluid flow characteristics.

A still further object of this invention is to improve fluid flow teaching and experimentation apparatus by facilitating the visual observation and physical measurement of the fluid flow influencing characteristics of objects introduced into a pre-established fluid flow environment.

These and other objects are attained in accordance with the present invention wherein there is provided a self-contained fluid flow observation and measuring system adapted for the studying of hydraulic flow principles and having adjustable fluid flow influencing control devices for varying the flow characteristics through the unit.

DESCRIPTION OF THE DRAWINGS

Further objects of the invention, together with additional features contributing thereto and advantages accruing therefrom, will be apparent from the following description of one embodiment of the invention when read in conjunction with the accompanying drawings, wherein:

FIG. 1 is a front profile view of the invention of this application with cover portions broken away to better illustrate the fluid circulation system;

FIG. 2 is a horizontal profile of the apparatus shown in FIG. 1 to better illustrate the observation and measuring portions of the invention of this application; and, FIG. 3 is a sectional view of the apparatus shown in FIG. 2 taken along lines 3—3 with additional portions broken away to better illustrate the features of the observation and measuring system.

DESCRIPTION OF THE PREFERRED EMBODIMENT

Referring now to FIG. 1, there is shown a hydraulic and fluid flow observation and measuring system 1. The apparatus comprises, in general, an observation and measuring portion or demonstration housing 100 and a fluid circulation system 200 which will be hereinafter described in detail. As shown, the unit 1 is supported on a plurality of casters 2 which are secured to suitable frame members 3 and allow the unit to be moved from location to location. A pair of adjustable support jacks 4 are appropriately secured to the bottom frame members 3 to stabilize the unit and prohibit movement during operation.

The fluid circulation portion 200 of the system is carried within a housing defined by frame members 3 and appropriately enclosed by a number of cover plates 5 which conceal the circulating system and have openings therein to provide access to controls for regulating the flow of fluid through the demonstration housing 100. A sump, or fluid resevoir 250, is carried within the fluid circulating portion 200 and supported on frame members 3 and a bottom support plate 6 carried thereby. The sump 250 is of a size to contain sufficient fluid for circulation through the observation and measuring portion and to maintain the desired test conditions.

Fluid removed from the sump by outlet 210 is passed through a motor driven pump PMP of a suitable size (approximately 50 gallons per minute) to circulate the fluid through the demonstration housing 100 for the testing and illustration of various hydraulic principles. A flow meter PG is connected to the delivery conduit or input pipe 215, at a point removed from the pump outlet, for indicating the velocity or rate of water flow. An inlet control valve CV–I is connected into pipe or line 215 at a position between the flow meter and input to the demonstration housing 100 to regulate the flow thereto.

The fluid is passed from the circulating portion 200 of the unit into the observation and measuring portion, to be hereinafter described in detail, and returned into the sump 250 through one of two return conduits 270 and 280. As best shown in FIG. 1, a return pipe 270 is connected from a by-pass section 110 of the observation housing 100 to return excess fluid which is not to be passed through the demonstration portion. Fluid entering the by-pass chamber 110 flows through the return conduit 270 directly into the sump. At the opposite end of the observation portion 100, there is a discharge or outlet chamber 160 to receive the fluid after passing therethrough and to return this fluid to the sump 250. An adjustable discharge flow control valve CV–D positioned in the return conduit between the sump and the return chamber 160 regulates the fluid flow return.

The observation and measuring portion or demonstration housing 100 has portions fabricated from a transparent material, such as plexiglass, to enable the observation and recording of flow characteristics occurring within the housing. A fluid inlet chamber 120 includes a foramenous member or screen 121 secured between transparent side walls 101 and 102 within the demonstration housing 100 to retain a plurality of spherical members 122, partially shown, which suppresses turbulence in the fluid as it is introduced into the fluid flow channel 150 through the fluid inlet sluice or gate 131.

Fluid passes from the inlet chamber 120 through the foramenous member 121 into a gating chamber 130 whereat the fluid level is controlled by means of a movable gate or sluice 131. The gate 131 is slidably supported between side walls 101 and 102 to retain a desired quantity of fluid within the chamber 130 thereby selectively establishing a predetermined head or water pressure.

Observation, testing and/or measuring of fluid flow characteristics occurs in the fluid flow channel 150 formed between the side walls 101 and 102, a top wall 151, and an adjustable wall 155. Side walls 101 and 102 are fabricated of a transparent material and are carried by a frame plate 3 normal to the plane of the base portion 152 and parallel to each other. The adjustable wall comprises a central segment 156 pivotally interengaged between a pair of opposed planar end segments 157 and 158, and selectively variable in their disposition relative to each other and the base portion 152. The base portion 152 is substantially parallel to the top wall 151 and slidably supports the free ends of segments 157 and 158 along its longitudinal axis.

Positioning of the adjustable wall 155 relative to the top wall and in contact with side walls 101 and 102 is accomplished by a suitable adjustment means 50, such as a gear rack 51, and a spur gear (not shown). The adjustable means is operated by a control knob or lever 52, accessible through the front cover plate with one end of the gear rack being secured to central segment 156. Rotation of the adjustment means raises or lowers the adjustable wall 155 to form the desired configuration for studying the hydraulic characteristics of the fluid flow through the fluid flow channel.

The flow rate of fluid through the fluid flow channel 150 can be controlled by the control valves CV–I and CV–D, and the adjustable wall 155 elevated so that the fluid flow channel forms a conduit (pipe) to investigate such things as the relative changes in the terms of Bernoulli's equation for converging flow; the relative energy losses in converging and diverging flow; and the principles of the venturi meter. In addition, through a predetermined setting of control valve CV–I and/or the adjustment of gate 131 and the adjustable wall 155, the fluid flow channel 150 will function as an open conduit or channel for investigating such hydraulic phenomena as the significance of critical depth and its influence on extreme water levels; the flow characteristics under an adjustable sluice gate; hydraulic jumps; flow over weirs; and the analysis of specific energy equations for supercritical/subcritical flow.

The functioning of the fluid flow channel 150 as a conduit or channel is accomplished through the positioning of the adjustable wall 155. The three pivotally interengaged planar segments 156, 157 and 158, comprising the adjustable wall, are movable from a position wherein the segments lie in the same plane parallel to and supported on the base portion 152, to a selectively varying disposition wherein the central segment 156 is elevated from a position supported on the base portion 152 into a position near the top wall 151 or secured in any position intermediate therebetween. Vertically movable central segment 156 is maintained in a position parallel to the base portion 152, and the top wall 151, with the opposed end segments 157 and 158 assuming an angular displacement relative to the top wall, base portion and central segment as determined by the height of the central segment 156 relative to the base portion 152.

After the fluid is passed through the fluid flow channel 150, it passes to an outlet chamber 160 for return to the sump 250. The outlet chamber 160 of the demonstration housing 100 includes an adjustable gate or outlet weir 161 the operation of which is accurately controlled by an adjustable hand crank 162 appropriately connected to the gate and supported from the demonstration housing to adjust the height of the opening of the flow from the fluid flow channel 150. The outlet weir 161 is slidably supported between side walls 101 and 102 of the demonstration housing to maintain the water level in the fluid flow channel 150 at the level desired by the observer. The bottom of the outlet chamber 160 carries a fluid outlet drain 163 which is connected to a suitable drain pipe to discharge the contents of the chamber into the sump 250. The control valve CV–D, positioned between the sump and the discharge outlet chamber 160, controls the flow rate of the fluid passing into the sump and thereby regulates the amount of fluid retained therein.

To aid the observer in the observation and measuring of various fluid flow characteristics and the testing of components positioned in the fluid flow channel 150, visually observable pressure and head measuring devices are provided. Three scales 107 and three pitot tubes 108, are provided to measure static pressure head and total head. The pitot tubes 108, are carried by the top wall 151 and supported through water tight collars 109 which allow the tubes to be adjusted to various positions within the fluid flow channel 150. The three scales are carried by one of the transparent side walls. In addition, the top wall 151 is formed with a removable section 159 to allow the observer access to the fluid flow channel 150 so that various flow influencing devices or objects may be introduced into the flow channel between the distal ends of the adjustable wall to determine their flow influencing characteristics.

While there has been shown and described one embodiment of the invention, it is obvious that various modifications and changes may be made thereto by one skilled in the art. It is applicant's intention that the invention not be limited to the exact structure disclosed as a preferred embodiment but to include those modifications and changes which come within the scope of his invention as defined in the appended claims.

Various modes of carrying out the invention are contemplated as being within the scope of the following claims, particularly pointing out and distinctly claiming the subject matter which is regarded as the invention.

I claim:

1. An educational fluid flow apparatus for providing a visually observable demonstration of hydraulic and fluid flow phenomena comprising housing means providing a fluid flow channel having a base portion, a fluid inlet and a fluid outlet, at least a portion of the housing means being fabricated from a transparent material, an adjustable wall disposed on the base portion of the fluid flow channel, adjustment means connected to the adjustable wall for selectively varying the vertical disposition thereof with respect to the base portion, means for delivering fluid to the fluid inlet of the housing means whereby the direction of fluid passing through the flow channel can be selectively varied and the results of such variation can be visually observed, the fluid flow channel provided by the housing means includes spaced upstanding sidewalls extending from the base portion thereof and the adjustable wall disposed on the base portion of the fluid flow channel extends between the sidewalls in contact therewith, said adjustable wall being supported for vertical adjustment relative to the sidewalls to permit variation of the fluid between the sidewalls in response to the selective variation of the adjustment means connected to the adjustable wall.

2. The educational fluid flow apparatus of claim 1 wherein the sidewalls are interconnected by a top wall spaced from the base portion and the adjustable wall disposed thereon to enable the production of water tunnel simulation.

3. The educational fluid flow apparatus of claim 1 wherein the means for the delivery of fluid to the fluid inlet of the housing comprise selectively variable control means to permit selective control of fluid delivery to the fluid flow channel.

4. The educational fluid flow apparatus of claim 1 wherein pressure and head measuring means are arranged in the housing means in predetermined locations to permit determination of pressure and head levels developed in the fluid flow channel.

5. An educational fluid flow apparatus for providing a visually observable demonstration of hydraulic and fluid flow phenomena comprising housing means providing a fluid flow channel having a base portion, a fluid inlet and a fluid outlet, at least a portion of the housing means being fabricated from a transparent material, an adjustable wall disposed on the base portion of the fluid flow channel, adjustment means connected to the adjustable wall for selectively varying the disposition thereof with respect to the base portion, and means for delivering fluid to the fluid inlet of the housing means whereby the direction of fluid passing through the flow channel can be selectively varied and the results of such variation can be visually observed, the fluid flow channel provided by the housing means includes spaced upstanding sidewalls extending from the base portion thereof and the adjustable wall disposed on the base portion of the fluid flow channel is adjustably positioned between the sidewalls in contact therewith to permit variation of the fluid level between the sidewalls in response to the selective variation of the adjustment means connected to the adjustable wall, the base portion of the fluid flow channel is substantially planar, the sidewalls are disposed in substantially normal relationship with respect to the plane of the base portion and in parallel relationship with respect to each other, and the adjustable wall comprises a plurality of pivotally inter-engaged planar segment supported upon and in parallel relationship with respect to the base portion in one selected condition and projecting from the base portion at a selected angle in another condition to modify the flow path of a fluid passing thereover.

6. The educational fluid flow apparatus of claim 5 wherein the adjustable wall includes at least three pivotally interengaged planar segments aligned in series along the longitudinal axis of the base portion, the three planar segments comprising a central segment disposed between a pair of opposed end segments, means are provided between the planar end segments and the base portion to produce the sliding movement of the segments with respect to the longitudinal axis of the base portion, and a portion of the adjustment means is connected to the central segment whereby the adjustable wall will produce an elevation of the fluid flow path in the housing means with respect to the sidewall which will have a generally trapezoidal profile.

7. An educational fluid flow apparatus for providing a visually observable demonstration of hydraulic and fluid flow phenomena comprising housing means providing a fluid flow channel having a base portion, a fluid inlet and a fluid outlet, at least a portion of the housing means being fabricated from a transparent material, an adjustable wall disposed on the base portion of the fluid flow channel, adjustment means connected to the adjustable wall for selectively varying the disposition thereof with respect to the base portion, and means for delivering fluid to the fluid inlet of the housing means whereby the direction of fluid passing through the flow channel can be selectively varied and the results of such variation can be visually observed, selectively adjustable inlet sluice means are disposed between the fluid flow passage inlet and the adjustable wall to permit selective variation of fluid flow in relation thereto.

8. An educational fluid flow apparatus for providing a visually observable demonstration of hydraulic and fluid flow phenomena comprising housing means providing a fluid flow channel having a base portion, a fluid inlet and a fluid outlet, at least a portion of the housing means being fabricated from a transparent material, an adjustable wall disposed on the base portion of the fluid flow channel, adjustment means connected to the adjustable wall for selectively varying the disposition thereof with respect to the base portion, and means for delivering fluid to the fluid inlet of the housing means whereby the direction of fluid passing through the flow channel can be selectively varied and the results of such variation can be visually observed, selective adjustable outlet weir means are disposed between the fluid flow passage outlet and the adjustable wall to permit selective variation of fluid flow in relation thereto.

9. An educational fluid flow apparatus for providing a visually observable demonstration of hydraulic and fluid flow phenomena comprising housing means providing a fluid flow channel having a base portion, a fluid inlet and a fluid outlet, at least a portion of the housing means being fabricated from a transparent material, an adjustable wall disposed on the base portion of the fluid flow channel, adjustment means connected to the adjustable wall for selectively varying the disposition thereof with respect to the base portion, and means for delivering fluid to the fluid inlet of the housing means whereby the direction of fluid passing through the flow channel can be selectively varied and the results of such variation can be visually observed, discharge flow control means are provided downstream from the adjustable wall in the fluid flow channel of the housing means to permit selective variation of the fluid discharge from the fluid flow channel.

10. A self-contained, portable, educational fluid flow apparatus for providing a visually observable demonstration of hydraulic and fluid flow phenomena comprising a frame, a fluid reservoir mounted on the frame, a pump connected in communication with the contents of the fluid reservoir, means for operating the pump, a fluid delivery conduit connected at one end in communication with the fluid reservoir and at another end with a fluid inlet formed in a demonstration housing supported by the frame, at least a portion of the demonstration housing being formed from a transparent material to permit visual observation of the fluid passing therethrough, the demonstration housing being provided with means forming a fluid flow channel communicating at one end with the fluid inlet and at another end with a fluid outlet formed in the demonstration housing, the fluid outlet being connected in communication with the fluid reservoir to permit continuous fluid recirculation through the fluid flow apparatus, and adjustable wall provided in the fluid flow channel to permit selective variation of the characteristics of the fluid flowing therethrough, adjustment means connected to the adjustable wall for selectively varying the disposition thereof relative to the fluid flow channel, fluid by-pass means are provided in the demonstration housing adjacent the fluid inlet thereof, the bypass means being connected in communication with the fluid reservoir to permit the return of over-flow fluid to the reservoir for recirculation.

11. A self-contained, portable, educational fluid flow apparatus for providing a visually observable demonstration of hydraulic and fluid flow phenomena comprising a frame, a fluid reservoir mounted on the frame, a pump connected in communication with the contents of the fluid reservoir, means for operating the pump, a fluid delivery conduit connected at one end in communication with the fluid reservoir and at another end with a fluid inlet formed in a demonstration housing supported by the frame, at least a portion of the demonstration housing being formed from a transparent material to permit visual observation of the fluid passing therethrough, the demonstration housing being provided with means forming a fluid flow channel communicating at one end with the fluid inlet and at another end with a fluid outlet formed in the demonstration housing, the fluid outlet being connected in communication with the fluid reservoir to permit continuous fluid recirculation through the fluid flow apparatus, an adjustable wall provided in the fluid flow channel to permit selective variation of the characteristics of the fluid flowing therethrough, and adjustment means connected to the adjustable wall for selectively varying the disposition thereof relative to the fluid flow channel, and turbulence suppression means are provided between the fluid inlet of the demonstration housing and the fluid flow channel therein.

12. A self-contained, portable, educational fluid flow apparatus for providing a visually observable demonstration of hydraulic and fluid flow phenomena comprising a frame, a fluid reservoir mounted on the frame, a pump connected in communication with the contents of the fluid reservoir, means for operating the pump, a fluid delivery conduit connected at one end in communication with the fluid reservoir and at another end with a fluid inlet formed in a demonstration housing supported by the frame, at least a portion of the demonstration housing being formed from a transparent material to permit visual observation of the fluid passing therethrough, the demonstration housing being provided with means forming a fluid flow channel communicating at one end with the fluid inlet and at another end with a fluid outlet formed in the demonstration housing, the fluid outlet being connected in communication with the fluid reservoir to permit continuous fluid recirculation through the fluid flow apparatus, an adjustable wall provided in the fluid flow channel to permit selective variation of the characteristics of the fluid flowing therethrough, adjustment means connected to the adjustable wall for selectively varying the disposition thereof relative to the fluid flow channel, a sluice member is provided between the fluid inlet into the demonstration housing and the adjustable wall thereof and is adjustably disposed across the fluid flow channel in flow interrupting relationship therewith, and sluice member adjustment means are operably connected to the sluice member to permit the selective positioning of the sluice member to control the degree of flow interruption.

13. A self-contained, portable, educational fluid flow apparatus for providing a visually observable demonstration of hydraulic and fluid flow phenomena comprising a frame, a fluid reservoir mounted on the frame, a pump connected in communication with the contents of the fluid reservoir, means for operating the pump, a fluid delivery conduit connected at one end in communication with the fluid reservoir and at another end with a fluid inlet formed in a demonstration housing supported by the frame, at least a portion of the demonstration housing being formed from a transparent material to permit visual observation of the fluid passing therethrough, the demonstration housing being provided with means forming a fluid flow channel communicating at one end with the fluid inlet and at another end with a fluid outlet formed in the demonstration housing, the fluid outlet being connected in communication with the fluid reservoir to permit continuous fluid recirculation through the fluid flow apparatus, adjustable wall provided in the fluid flow channel to permit selective variation of the characteristics of the fluid flowing therethrough, and adjustment means connected to the adjustable wall for selectively varying the disposition thereof relative to the fluid flow channel, a weir member is provided between the adjustable wall of the demonstration housing and the fluid outlet thereof and is adjustably disposed across the fluid flow channel downstream from the adjustable wall in flow interrupting relationship with the adjustable wall, and weir member adjustment means are operably connected to the weir member to permit the selective positioning of the weir member to control the degree of flow interruption thereof.

14. A self-contained, portable, educational fluid flow apparatus for providing a visually observable demonstration of hydraulic and fluid flow phenomena comprising a frame, a fluid reservoir mounted on the frame, a pump connected in communication with the contents of the fluid reservoir, means for operating the pump, a fluid delivery conduit connected at one end in communication with the fluid reservoir and at another end with a fluid inlet formed in a demonstration housing supported by the frame, at least a portion of the demonstration housing being formed from a transparent material to permit visual observation of the fluid passing therethrough, the demonstration housing being provided with means forming a fluid flow channel communicating at one end with the fluid inlet and at another end with a fluid outlet formed in the demonstration housing, the fluid outlet being connected in communication with the fluid reservoir to permit continuous fluid recirculation through the fluid flow apparatus, an adjustable wall provided in the fluid flow channel to permit selective variation of the characteristics of the fluid flowing therethrough, adjustment means connected to the adjustable wall for selectively varying the disposition thereof relative to the fluid flow channel, at least that portion of the fluid flow channel disposed between the distal ends of the adjustable wall in the demonstration housing, provides a substantially enclosed fluid flow conduit and an opening is provided in the substantially enclosed portion of the fluid flow conduit to permit the introduction of flow influencing device into the flow path of fluid passing through the conduit.

15. A self-contained, portable, educational fluid flow apparatus for providing a visually observable demonstration of hydraulic and fluid flow phenomena comprising a frame, a fluid reservoir mounted on the frame, a pump connected in communication with the contents of the fluid reservoir, means for operating the pump, a fluid delivery conduit connected at one end in communication with the fluid reservoir and at another end with a fluid inlet formed in a demonstration housing supported by the frame, at least a portion of the demonstration housing being formed from a transparent material to permit visual observation of the fluid passing therethrough, the demonstration housing being provided with means forming a fluid flow channel communicating at one end with the fluid inlet and at another end with a fluid outlet formed in the demonstration housing, the fluid outlet being connected in communication with the fluid reservoir to permit continuous fluid recirculation through the fluid flow apparatus, adjustable wall provided in the fluid flow channel to permit selective variation of the characteristics of the fluid flowing therethrough, adjustment means connected to the adjustable wall for selectively varying the disposition thereof relative to the fluid flow channel, a visually observable means for measuring the rate of fluid flow through the fluid delivery conduit is connected in communication with the delivery conduit, a first control valve is interposed in the fluid delivery conduit and is disposed to selectively regulate the rate of fluid flow therethrough, a fluid return conduit interconnects the outlet of the demonstration housing with the fluid reservoir, and a second control valve means is interposed in the fluid return conduit to permit selective regulation of the rate of return fluid flow therethrough.

* * * * *